US012198603B2

(12) United States Patent
Min et al.

(10) Patent No.: US 12,198,603 B2
(45) Date of Patent: Jan. 14, 2025

(54) TOUCH DISPLAY DRIVING APPARATUS, METHOD AND TOUCH DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Hang Min, Beijing (CN); Shuwei Li, Beijing (CN); Kwanggyun Jang, Beijing (CN); Hongqiang Luo, Beijing (CN); Qiang Wang, Beijing (CN); Ciyi Qingsha, Beijing (CN); Xiaofeng Luo, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/802,542

(22) PCT Filed: Nov. 8, 2021

(86) PCT No.: PCT/CN2021/129183
§ 371 (c)(1),
(2) Date: Aug. 26, 2022

(87) PCT Pub. No.: WO2022/193683
PCT Pub. Date: Sep. 22, 2022

(65) Prior Publication Data

US 2024/0194115 A1 Jun. 13, 2024

(30) Foreign Application Priority Data

Mar. 19, 2021 (CN) ........................ 202110297022.9

(51) Int. Cl.
*G09G 3/20* (2006.01)

(52) U.S. Cl.
CPC ....... *G09G 3/2096* (2013.01); *G09G 2310/08* (2013.01); *G09G 2330/022* (2013.01); *G09G 2354/00* (2013.01); *G09G 2370/08* (2013.01)

(58) Field of Classification Search
CPC ............ G09G 3/2096; G09G 2310/08; G09G 2330/022; G09G 2354/00; G09G 2370/08
(Continued)

(56) References Cited

U.S. PATENT DOCUMENTS

2007/0273560 A1 11/2007 Hua et al.
2014/0232691 A1 8/2014 Lee
(Continued)

FOREIGN PATENT DOCUMENTS

CN 107643845 A 1/2018
CN 107728832 A 2/2018
(Continued)

OTHER PUBLICATIONS

International Search Report for PCT/CN2021/129183 Mailed Jan. 28, 2022.
(Continued)

*Primary Examiner* — Amare Mengistu
*Assistant Examiner* — Gloryvid Figueroa-Gibson
(74) *Attorney, Agent, or Firm* — Ling Wu; Stephen Yang; Ling and Yang Intellectual Property

(57) ABSTRACT

A touch display driving apparatus, a method, and a touch display apparatus are provided. The touch display driving apparatus includes: an analog front end, a timing controller, and a master oscillator, herein, the master oscillator is connected with a signal input and output end, the analog front end, and the timing controller, respectively, and is configured to provide a first output signal to the analog front
(Continued)

end and provide a second output signal to the timing controller, under controlling of the signal input and output end.

20 Claims, 6 Drawing Sheets

(58) Field of Classification Search
USPC .......................................................... 345/173
See application file for complete search history.

(56) References Cited

U.S. PATENT DOCUMENTS

| | | | | |
|---|---|---|---|---|
| 2018/0024677 | A1 | 1/2018 | Kim et al. | |
| 2018/0046325 | A1* | 2/2018 | Kim | G06F 3/0412 |

FOREIGN PATENT DOCUMENTS

| | | | |
|---|---|---|---|
| CN | 109388264 | A | 2/2019 |
| CN | 112860124 | A | 5/2021 |

OTHER PUBLICATIONS

Office Action dated Mar. 3, 2022 for Chinese Patent Application No. 202110297022.9 and English Translation.
Notification to Grant dated Aug. 5, 2022 for Chinese Patent Application No. 202110297022.9 and English Translation.

* cited by examiner

TOUCH DISPLAY DRIVING APPARATUS, METHOD AND TOUCH DISPLAY APPARATUS

CROSS-REFERENCE TO RELATED APPLICATIONS

The present application is a U.S. National Phase Entry of International Application No. PCT/CN2021/129183 having an international filing date of Nov. 8, 2021, which claims priority to Chinese patent application No. 202110297022.9, filed to the CNIPA on Mar. 19, 2021, and entitled "Touch Display Driving Apparatus, Method and Touch Display Apparatus". The above-identified applications are hereby incorporated by reference.

TECHNICAL FIELD

Embodiments of the present disclosure relate to, but are not limited to, the field of display technologies, and particularly to a touch display driving apparatus, a method, and a touch display apparatus.

BACKGROUND

With a continuous development of display technologies, touch display apparatuses have been widely used. Usually, a touch panel and a display panel in a touch display apparatus are independently controlled by two chips, respectively. In order to improve an integration level of the touch display apparatus, a Touch and Display Driver Integration (TDDI) chip emerges as the times required.

TDDI products are widely used because of their relatively high touch sensitivity, lightness and thinness, and other advantages. However, in a current TDDI chip, only a function of a touch driving chip and a function of a display driving chip are simply integrated into a single chip, wherein in a working operation, the function of the touch driving chip and the function of the display driving chip are implemented in three independent oscillator (OSC) components, which will lead to a relatively large device size and a relatively high power consumption.

SUMMARY

The following is a summary of subject matters described herein in detail. The summary is not intended to limit the protection scope of claims.

In a first aspect, an embodiment of the present disclosure provides a touch display driving apparatus, including: an analog front end, a timing controller, and a master oscillator, wherein, the master oscillator is connected with a signal input and output end, the analog front end, and the timing controller, respectively, and is configured to provide a first output signal to the analog front end and provide a second output signal to the timing controller, under controlling of the signal input and output end.

In a second aspect, an embodiment of the present disclosure provides a touch display apparatus, including: a touch display panel and a touch display driving apparatus connected with the touch display panel, wherein, the touch display driving apparatus is the touch display driving apparatus in the above embodiment.

In a third aspect, an embodiment of the present disclosure provides a driving method, which is applied to the touch display driving apparatus in the above embodiment. The method includes: providing, by a master oscillator, a first output signal to an analog front end and providing a second output signal to a timing controller, under controlling of a signal input and output end.

Other characteristics and advantages of the present disclosure will be elaborated in the following specification, and moreover, partially become apparent from the specification or are understood by implementing the present disclosure. Other advantages of the present disclosure may be achieved and obtained through solutions described in the specification and drawings.

Other aspects may be understood upon reading and understanding the drawings and the detailed description.

BRIEF DESCRIPTION OF DRAWINGS

The accompanying drawings are used for providing understanding for technical solutions of the present disclosure, and form a part of the specification. They are used for explaining the technical solutions of the present disclosure together with the embodiments of the present disclosure, but do not form a limitation on the technical solutions of the present disclosure. Shapes and sizes of each component in the drawings do not reflect actual scales, and are only intended to schematically illustrate contents of the present disclosure.

DETAILED DESCRIPTION

Figure 1A:
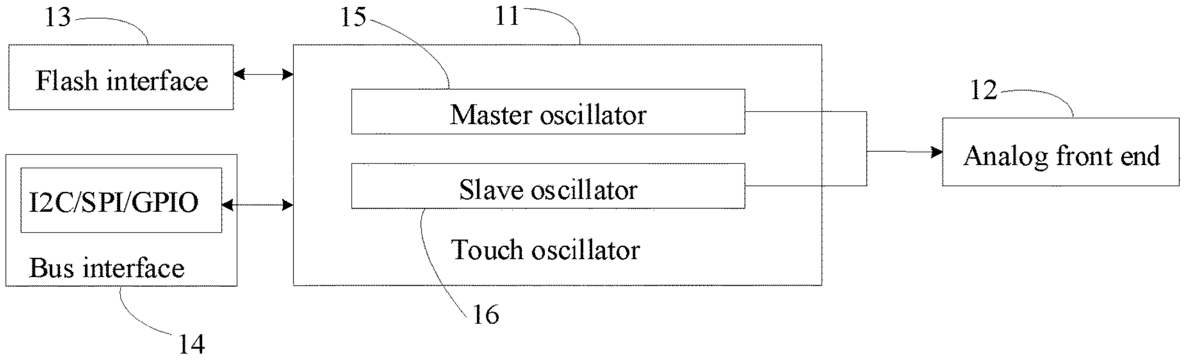
FIG. 1A is a schematic structural diagram of a touch driving chip.

A plurality of embodiments are described herein. However, the description is exemplary and unrestrictive, and more embodiments and implementation solutions may be within a scope contained in the embodiments described herein. Although many possible combinations of features are shown in the accompanying drawings and discussed in specific implementations, many other combinations of the disclosed features are also possible. Unless expressly limited, any feature or element of any embodiment may be used in combination with, or may replace, any other feature or element in any other embodiment.

When describing representative embodiments, the specification may have presented methods and/or processes as a specific order of steps. However, to an extent that the method or process does not depend on a specific sequence of the acts herein, the method or process should not be limited to the acts in the specific sequence. Those of ordinary skills in the art will understand that other orders of act may also be possible. Therefore, the specific order of the steps illustrated in the specification should not be interpreted as a limitation on claims. Moreover, the claims directed to the method and/or process should not be limited to performing their acts in the described order, and those skilled in the art will readily understand that these orders may be varied and still remain within the essence and scope of the embodiments of the present disclosure.

In the drawings, a size of each constituent element, a thickness of a layer, or a region is exaggerated sometimes for clarity. Therefore, an implementation of the present disclosure is not necessarily limited to the size shown, and a shape and size of each component in the drawings do not reflect true proportions. In addition, the drawings schematically illustrate ideal examples, and one embodiment of the present disclosure is not limited to the shapes, numerical values, or the like shown in the drawings.

Ordinal numerals such as "first", "second", and "third" in the specification are set to avoid confusion of constituent elements, but not to set a limit in quantity.

In the specification, for convenience, expressions indicating orientation or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element has a particular orientation and is structured and operated in the particular orientation. Therefore, they cannot be understood as limitations on the present disclosure. The positional relationships between the constituent elements may be changed as appropriate according to a direction according to which each constituent element is described. Therefore, appropriate replacements can be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the specification, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be the drain electrode, and a second electrode may be the source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

A touch display panel in a touch display apparatus may be independently controlled by two chips. Here, the touch display panel refers to a display panel with a touch sensing capability. Herein, the touch display panel may include: a Touch Panel (TP) and a display panel, wherein the touch panel may be controlled by a touch driving chip (Touch IC, TIC), and the display panel may be controlled by a display driving chip (Display Driver IC, DDI).

FIG. 1A is a schematic structural diagram of a touch driving chip. As shown in FIG. 1A, a conventional touch driving chip may include: a touch oscillator (TP_OSC) 11 and an Analog Front End (AFE) 12 connected with the touch oscillator 11, wherein the touch oscillator 11 is configured to integrate data signals inputted from a flash interface 13 and a bus interface 14 and transmit them to the analog front end 12. Herein, the touch oscillator 11 in the traditional touch driving chip is independently inside the touch driving chip, and may generally include: a master oscillator (TP_Main_OSC) 15 and a slave oscillator (TP_Sub_OSC) 16, the master oscillator 15 and the slave oscillator 16 being both connected with the analog front end 12, the flash interface 13, and the bus interface 14, respectively, so that data transmitted by the flash interface 13 and the bus interface 14 may be integrated through the two oscillators and transmitted to the Analog Front End (AFE) 12. For example, the bus interface 14 may include: any one or more of an Inter-integrated Circuit (I2C) interface, a Serial Peripheral Interface (SPI), and a General Purpose Input/Output (GPIO) interface.

Figure 1B:
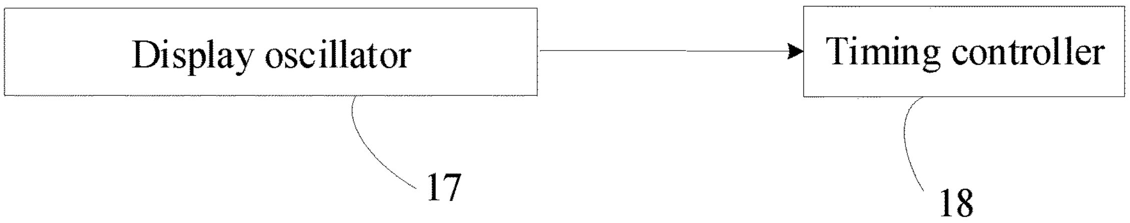
FIG. 1B is a schematic structural diagram of a display driving chip.

FIG. 1B is a schematic structural diagram of a display driving chip. As shown in FIG. 1B, a conventional display driving chip may include: a display oscillator (DIC_OSC) 17 and a timing controller 18 connected with the display oscillator 17. Herein, in the display driving chip, a timing waveform may be stabilized by arranging a display oscillator 17 before the timing controller 18, so that the timing controller 18 may output a timing signal of a stable waveform to the touch display panel.

Figure 1C:
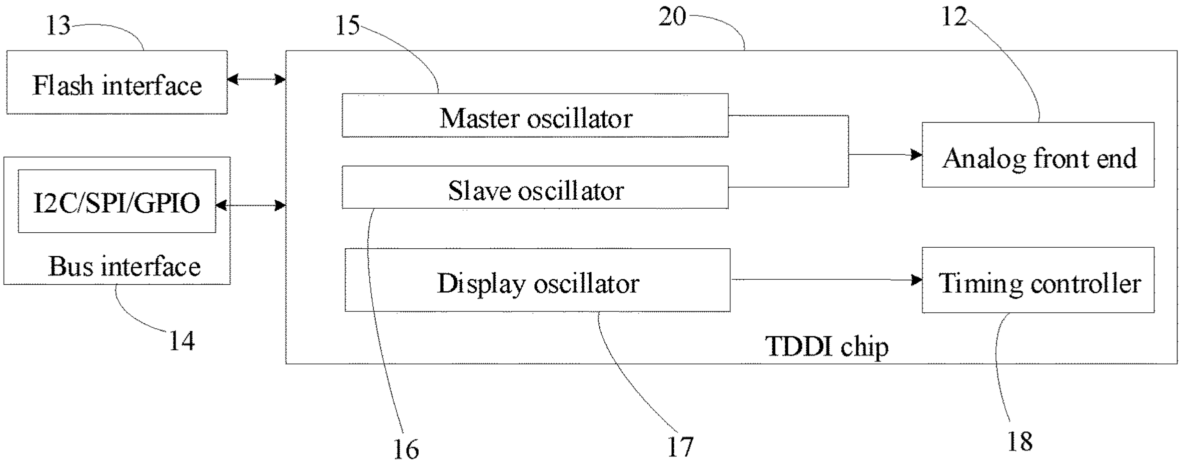
FIG. 1C is a schematic structural diagram of a touch display driving chip.

FIG. 1C is a schematic structural diagram of a touch display driving chip. As shown in FIG. 1C, in order to improve an integration level of a touch display apparatus, functions of the display driving chip and the touch driving chip may be integrated into one touch display driving chip to drive the touch display panel. However, in the solution shown in FIG. 1C, a traditional touch display driving chip only simply encapsulates the display oscillator 17 in the display driving chip and the master oscillator 15 and the slave oscillator 16 in the touch driving chip in one touch display driving chip. In a working operation, the display oscillator 17, the master oscillator 15, and the slave oscillator 16 all work independently, which does not achieve a common effect, which will lead to relatively large device size and a certain loss of a power consumption, affecting a development and an application of the touch display driving chip (TDDI chip).

An embodiment of the present disclosure provides a touch display driving apparatus, which may be applied to driving a touch display panel. For example, it may be applied to a touch display apparatus, and the touch display driving apparatus may be connected with a touch display panel in the touch display apparatus.

Figure 2:
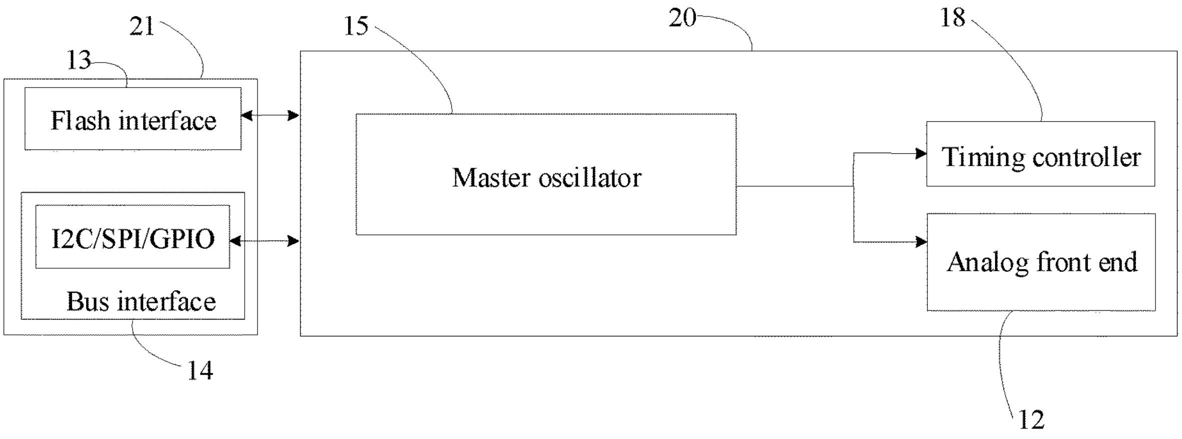
FIG. 2 is a schematic structural diagram of a touch display driving apparatus in an exemplary embodiment of the present disclosure.

FIG. 2 is a schematic structural diagram of a touch display driving apparatus in an exemplary embodiment of the present disclosure. As shown in FIG. 2, the touch display driving apparatus 20 may include: an analog front end 12, a timing controller 18, and a master oscillator 15, wherein the master oscillator 15 is connected with a signal input and output end 21, the analog front end 12, and the timing controller 18, respectively; herein the master oscillator 15 may be configured to provide a first output signal to the analog front end 12 and provide a second output signal to the timing controller 18, under controlling of the signal input and output end 21. For example, as shown in FIG. 2, the signal input and output end 21 may include: any one or more of an Inter-integrated Circuit (I2C) interface, a Serial Peripheral Interface (SPI), and a General Purpose Input/Output (GPIO) interface, as well as a flash interface 13.

In this way, the touch display driving apparatus according to the embodiment of the present disclosure cancels, in a working operation, original slave oscillator and display oscillator in the touch display driving chip, so that the analog front end and the timing controller share the master oscillator, so, optimization of a space of the touch display driving apparatus may be achieved, and an amount of processed data may be maximized in same processing time, which avoid waste of resources. Moreover, by sharing the master oscillator, a size of the touch display driving apparatus will be reduced, which can save a space required by a device, facilitating a development and an application of miniaturization of the device. Moreover, by sharing the master oscillator, a loss of a power consumption caused by the slave oscillator and the display oscillator may be effectively avoided, so that a power consumption of the device will also be reduced.

Figure 3:
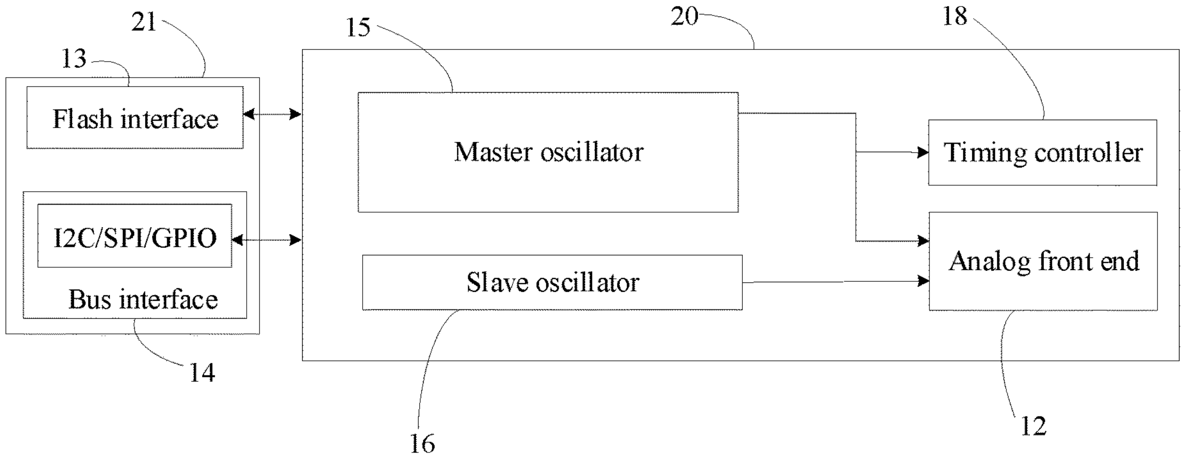
FIG. 3 is another schematic structural diagram of a touch display driving apparatus in an exemplary embodiment of the present disclosure.

FIG. 3 is another schematic structural diagram of a touch display driving apparatus in an exemplary embodiment of the present disclosure. As shown in FIG. 3, the touch display driving apparatus 20 may include: an analog front end 12, a timing controller 18, a master oscillator 15, and a slave oscillator 16, wherein the master oscillator 15 is connected with a signal input and output end 21, the analog front end 12, and the timing controller 18, respectively, and the slave oscillator 16 is connected with the signal input and output end 21 and the analog front end 12, respectively; herein, the master oscillator 15 may be configured to provide a first output signal to the analog front end 12 and provide a second output signal to the timing controller 18, under controlling of the signal input and output end 21; and the slave oscillator 16 may be configured to provide a third output signal to the analog front end 12, under controlling of the signal input and output end 21. For example, as shown in FIG. 3, the signal input and output end 21 may include: any one or more of an Inter-integrated Circuit (I2C) interface, a Serial Peripheral Interface (SPI), and a General Purpose Input/Output (GPIO) interface, as well as a flash interface 13.

In this way, for the touch display driving apparatus according to the embodiment of the present disclosure, on one hand, in a working operation, the original display oscillator in the touch display driving chip is canceled, and the analog front end and the timing controller are set to share the master oscillator, so, by sharing the master oscillator, the size of the touch display driving apparatus is made to be reduced, which can save the space required by the device, facilitating the development and the application of the miniaturization of the device. Moreover, by canceling the display oscillator, the loss of the power consumption caused by the display oscillator may be effectively avoided, so that the power consumption of the device will also be reduced. On the other hand, the slave oscillator is set to assist the master oscillator to work, and by integrating data inputted from the signal input and output end by the slave oscillator and the master oscillator, two paths of signals (including the first output signal transmitted by the master oscillator to the analog front end and the third output signal transmitted by the slave oscillator to the analog front end) may be transmitted to the analog front end, so, by reasonable utilization of the slave oscillator and the master oscillator in a same space, a data transmission speed may be made to increase, and an operation speed of the touch display driving apparatus may be improved.

Figure 4:
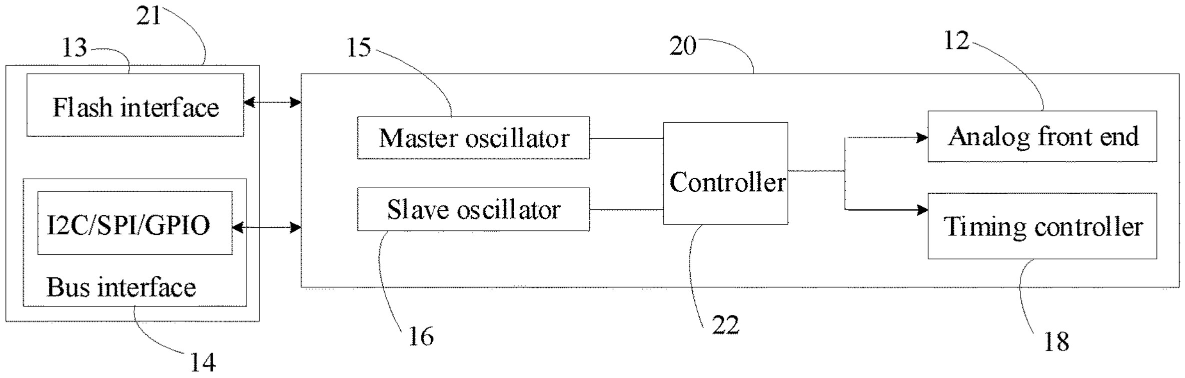
FIG. 4 is yet another schematic structural diagram of a touch display driving apparatus in an exemplary embodiment of the present disclosure.

FIG. 4 is yet another schematic structural diagram of a touch display driving apparatus in an exemplary embodiment of the present disclosure. As shown in FIG. 4, the touch display driving apparatus 20 may include: an analog front end 12, a timing controller 18, a master oscillator 15, a slave oscillator 16, and a controller 22, wherein the controller 22 is connected with the master oscillator 15, the slave oscillator 16, the analog front end 12, and the timing controller 18, respectively, the master oscillator 15 is connected with a signal input and output end 21 and is connected with the analog front end 12 and the timing controller 18 through the controller 22 respectively, and the slave oscillator 16 is connected with the signal input and output end 21 and is connected with the analog front end 12 and the timing controller 18 through the controller 22 respectively. Herein, the controller 22 may be configured to control, according to a working mode of the touch display driving apparatus 20, a first connection state between the master oscillator 15, the analog front end 12 and the timing controller 18, and control a second connection state between the slave oscillator 16, the analog front end 12 and the timing controller 18, wherein the working mode of the touch display driving apparatus 20 may include a normal mode and a sleep mode, and a power consumption of the touch display driving apparatus 20 in the sleep mode is less than a power consumption of the touch display driving apparatus 20 in the normal mode.

In this way, on one hand, in a working operation, the touch display driving apparatus according to the embodiment of the present disclosure cancels the original display oscillator in the touch display driving chip, controls, by the controller according to the working mode of the touch display driving apparatus, the first connection state between the master oscillator, the analog front end and the timing controller, and controls the second connection state between the slave oscillator, the analog front end and the timing controller, to control sharing the master oscillator or sharing the slave oscillator, achieving a reasonable use of the master oscillator and the slave oscillator, which may not only make a size of the touch display driving apparatus be reduced, save a space required by a device, facilitate a development and an application of miniaturization of the device, but also effectively avoid a loss of a power consumption caused by the display oscillator, so that a power consumption of the device will also be reduced.

In an exemplary embodiment, as shown in FIG. 4, the controller 22 may be configured to conduct connections between the master oscillator 15, and the analog front end 12 and the timing controller 18, and disconnect connections between the slave oscillator 16, and the analog front end 12 and the timing controller 18, when the working mode of the touch display driving apparatus 20 is the normal mode; the master oscillator 15 may be configured to provide a first output signal to the analog front end 12 and provide a second output signal to the timing controller 18, under controlling of the signal input and output end 21, when the working mode of the touch display driving apparatus 20 is the normal mode; and the slave oscillator 16 may be configured not to work, when the working mode of the touch display driving apparatus 20 is the normal mode. Or, the controller 22 may be configured to disconnect connections between the master oscillator 15, and the analog front end 12 and the timing controller 18 and conduct connections between the slave oscillator 16, and the analog front end 12 and the timing controller 18, when the working mode of the touch display driving apparatus 20 is the sleep mode; the master oscillator 15 may be configured not to work, when the working mode of the touch display driving apparatus 20 is the sleep mode; and the slave oscillator 16 may be configured to provide a third output signal to the analog front end 12 and provide a fourth output signal to the timing controller 18, under controlling of the signal input and output end 21, when the working mode of the touch display driving apparatus is the sleep mode.

For example, as shown in FIG. 4, the signal input and output end 21 may include: any one or more of an Inter-integrated Circuit (I2C) interface, a Serial Peripheral Interface (SPI), and a General Purpose Input/Output (GPIO) interface, as well as a flash interface.

In this way, on one hand, in a working operation, the touch display driving apparatus according to the embodiment of the present disclosure cancels the original display oscillator in the touch display driving chip, and controls, by the controller according to the working mode of the touch display driving apparatus, the analog front end and the timing controller to share the master oscillator or share the slave oscillator, so, a size of the touch display driving apparatus may be made to be reduced, which can save a space required by a device, facilitating a development and an application of miniaturization of the device, and a loss of a power consumption caused by the display oscillator may be effectively avoided, so that a power consumption of the device will also be reduced. On the other hand, when the working mode of the touch display driving apparatus is the normal mode, the controller controls the analog front end and the timing controller to share the master oscillator, and when the working mode of the touch display driving apparatus is the sleep mode, the controller controls the analog front end and the timing controller to share the slave oscillator, which may achieve a reasonable use of the master oscillator and the slave oscillator, so that a power consumption will be lower, when the working mode of the touch display driving apparatus is the sleep mode.

In an exemplary embodiment, as shown in FIG. 4, the controller 22 may be configured to conduct connections between the master oscillator 15, the analog front end 12 and the timing controller 18, conduct a connection between the slave oscillator 16 and the timing controller 18, and disconnect a connection between the slave oscillator 16 and the analog front end 12, when the working mode of the touch display driving apparatus 20 is the normal mode; the master oscillator 15 may be configured to provide a first output signal to the analog front end 12 and provide a second output signal to the timing controller 18, under controlling of the signal input and output end 21, when the working mode of the touch display driving apparatus 20 is the normal mode; and the slave oscillator 16 may be configured to provide a third output signal to the analog front end 12, under controlling of the signal input and output end 21, when the working mode of the touch display driving apparatus 20 is the normal mode. Or, the controller 22 may be configured to disconnect the connections between the master oscillator 15, and the analog front end 12 and the timing controller 18 and conduct the connections between the slave oscillator 16, and the analog front end 12 and the timing controller 18, when the working mode of the touch display driving apparatus 20 is the sleep mode; the master oscillator 15 may be configured not to work, when the working mode of the touch display driving apparatus 20 is the sleep mode; and the slave oscillator 16 may be configured to provide a third output signal to the analog front end 12 and provide a fourth output signal to the timing controller 18, under controlling of the signal input and output end 21, when the working mode of the touch display driving apparatus is the sleep mode.

In this way, on one hand, in a working operation, the touch display driving apparatus according to the embodiment of the present disclosure cancels the original display oscillator in the touch display driving chip, and controls, by the controller according to the working mode of the touch display driving apparatus, sharing the master oscillator or the slave oscillator, which may make a size of the touch display driving apparatus be reduced, save a space required by a device, facilitate a development and an application of miniaturization of the device, and effectively avoid a loss of a power consumption caused by the display oscillator, so that a power consumption of the device will also be reduced. On another hand, when the working mode of the touch display driving apparatus is the normal mode, the controller controls the analog front end and the timing controller to share the master oscillator, and when the working mode of the touch display driving apparatus is the sleep mode, the controller controls the analog front end and the timing controller to share the slave oscillator, which may achieve a reasonable use of the master oscillator and the slave oscillator, so that a power consumption will be lower, when the working mode of the touch display driving apparatus is the sleep mode. On yet another hand, when the working mode of the touch display driving apparatus is the normal mode, the controller controls the analog front end and the timing controller to share the master oscillator, and the slave oscillator is set to assist the master oscillator to work, and by integrating data inputted from the signal input and output end by the slave oscillator and the master oscillator, two paths of signals (including the first output signal transmitted by the master oscillator to the analog front end and the third output signal transmitted by the slave oscillator to the analog front end) may be transmitted to the analog front end, so, when the working mode of the touch display driving apparatus is the normal mode, by reasonable utilization of the slave oscillator and the master oscillator in a same space, a data transmission speed may be made to increase, improving an operation speed of the touch display driving apparatus.

In an exemplary embodiment, relatively speaking, a power consumption of the touch display driving apparatus when the working mode of the touch display driving apparatus is the normal mode is higher than a power consumption of the touch display driving apparatus when the working mode of the touch display driving apparatus is the sleep mode, i.e. the sleep mode is a low power consumption mode relative to the normal mode. For example, when the working mode of the touch display driving apparatus is the sleep mode, a resolution rate or a refresh rate of the touch display panel driven by the touch display driving apparatus may be lower than a resolution rate or a refresh rate of the touch display panel driven by the touch display driving apparatus when the working mode of the touch display driving apparatus is the normal mode.

In an exemplary embodiment, a frequency of the third output signal may be less than a frequency of the first output signal. In this way, the power consumption of the touch display driving apparatus may be made to be lower.

In an exemplary embodiment, a frequency of the fourth output signal may be less than a frequency of the second output signal. In this way, the power consumption of the touch display driving apparatus may be made to be lower.

In an exemplary embodiment, the controller may include, but is not limited to, any one of a Microcontroller Unit (MCU) and a control circuit including at least one transistor. For example, the controller may be a P-type transistor, an N-type transistor, or of a combination structure of the P-type transistor and the N-type transistor, etc., wherein the P-type transistor is conducted when a gate is at a low level and turned off when the gate is at a high level; and the N-type transistor is conducted when a gate is at a high level and turned off when the gate is at a low level. For example, a transistor in the embodiments of the present disclosure may be a thin film transistor, or a field effect tube, or other devices with a same characteristic. For example, the thin film transistor used in the embodiments of the present disclosure may be an oxide semiconductor transistor.

In an exemplary embodiment, the touch display driving apparatus may be implemented as one TDDI chip.

Figure 5A:
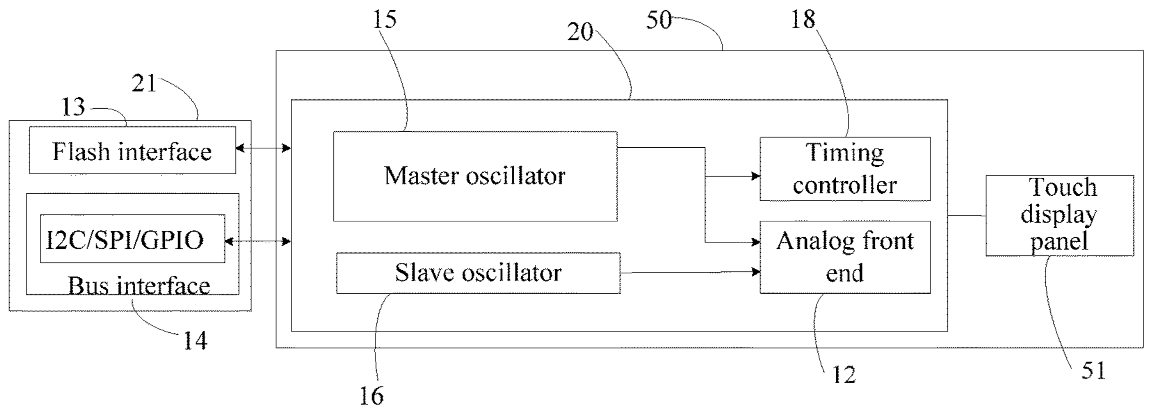
FIG. 5A is a schematic structural diagram of a touch display apparatus in an exemplary embodiment of the present disclosure.
Figure 5B:
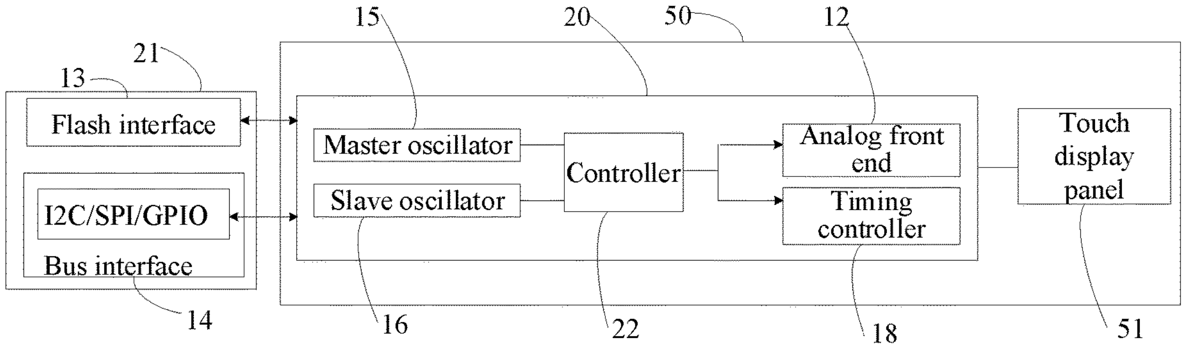
FIG. 5B is another schematic structural diagram of a touch display apparatus in an exemplary embodiment of the present disclosure.

An embodiment of the present disclosure also provides a touch display apparatus. FIG. 5A is a schematic structural diagram of a touch display apparatus in an exemplary embodiment of the present disclosure, and FIG. 5B is another schematic structural diagram of a touch display apparatus in an exemplary embodiment of the present disclosure. As shown in FIGS. 5A and 5B, the touch display apparatus 50 may include a touch display panel 51 and a touch display driving apparatus 20 in one or more of the above embodiments, wherein the touch display driving apparatus 20 is connected with the touch display panel 51. Here, the touch display driving apparatus shown in FIG. 3 is illustrated as an example in FIG. 5A and the touch display driving apparatus shown in FIG. 4 is illustrated as an example in FIG. 5B.

In an exemplary embodiment, as shown in FIGS. 5A and 5B, the analog front end 12 is connected with the touch display panel 51, and is configured to process at least one of the first output signal and the third output signal, providing a touch driving signal to the touch display panel 51. For example, as shown in FIG. 6, the touch display panel 51 may include a touch panel 64 and a display panel 63, wherein the analog front end 12 may be connected with the touch panel 64.

In an exemplary embodiment, as shown in FIGS. 5A and 5B, the timing controller 18 is connected with the touch display panel 51, and is configured to provide a timing signal of a stable waveform to the touch display panel 51 according to the second output signal or the fourth output signal. For example, as shown in FIG. 6, the touch display panel 51 may include a touch panel 64 and a display panel 63, wherein the timing controller 18 may be connected with the display panel 63.

In an exemplary embodiment, the touch display panel has a display region A and a non-display region C located beside the display region A (e.g. one side, both sides or a peripheral side of the display region A), wherein the non-display region C includes a binding region B. Herein, there may be a gap between the display region A and the binding region B. For example, the touch display panel may include a plurality of touch electrodes arranged in an array. For example, the touch display driving apparatus is disposed within the binding region B of the touch display panel. For example, the touch display driving apparatus is electrically connected with a plurality of touch electrodes through a plurality of touch signal lines, and a touch driving signal may be transmitted to the plurality of touch electrodes included in the touch display panel through the plurality of touch signal lines.

Figure 6:
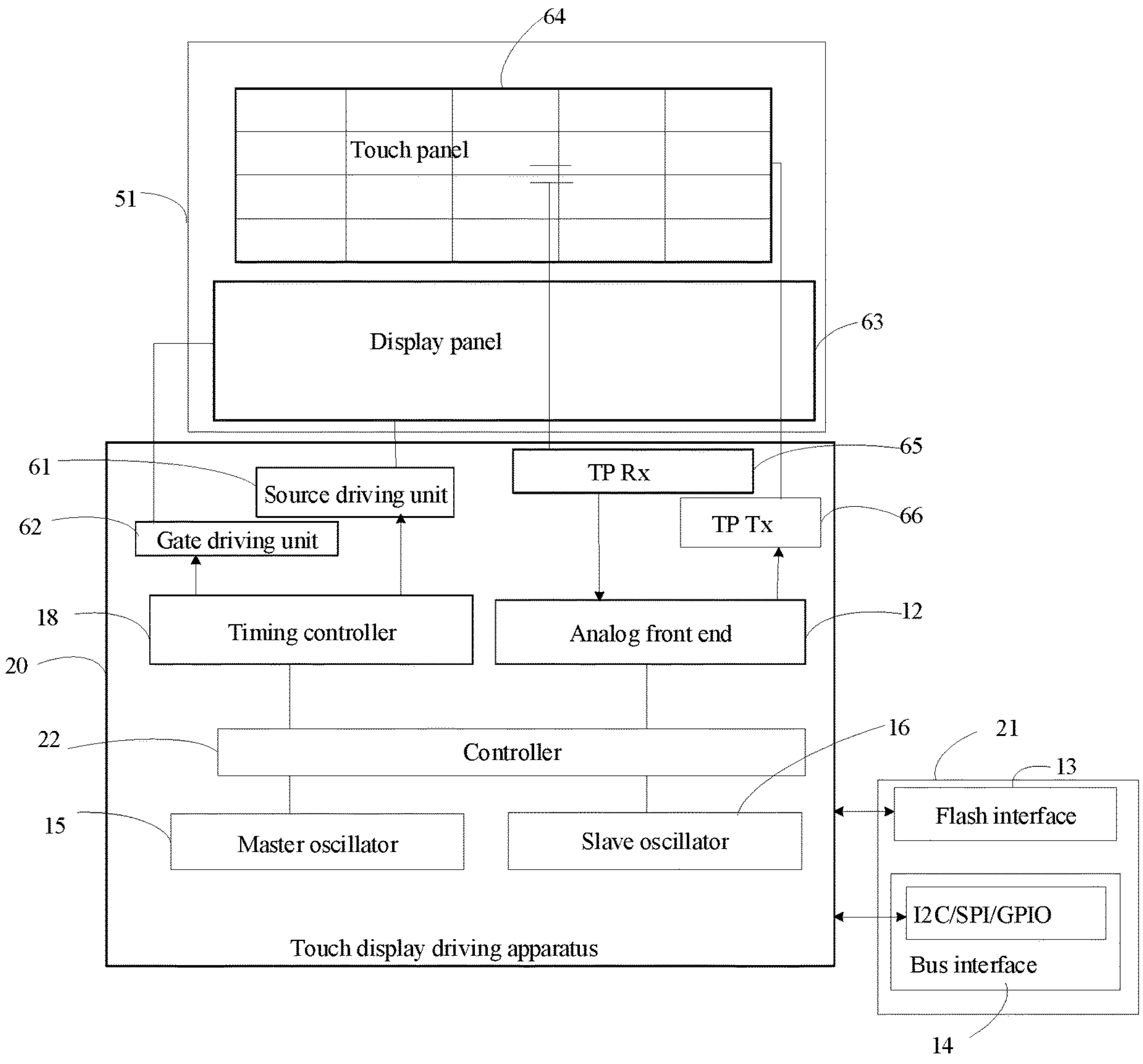
FIG. 6 is yet another schematic structural diagram of a touch display apparatus in an exemplary embodiment of the present disclosure.

In an exemplary embodiment, taking the touch display panel being an Organic Light-Emitting Diode (OLED) display panel as an example, as shown in FIG. 6, the touch display driving apparatus 20 may further include a source driving unit (i.e., a data driver) 61, a gate driving unit (i.e., a scanning driver) 62, and a light-emitting driver (not shown in the figure), and the display panel 63 may include a pixel array, wherein the pixel array may include a plurality of scanning signal lines (S1 to Sm), a plurality of data signal lines (D1 to Dn), a plurality of light-emitting signal lines (E1 to Eo), and a plurality of pixels Pxij. For example, the timing controller 18 may provide a gray-scale value and a control signal, which are suitable for a specification of the source driving unit (i.e., the data driver) 61, to the source driving unit (i.e., the data driver) 61, provide a clock signal, a scanning start signal, or the like, which are suitable for a specification of the gate driving unit (i.e., the scanning driver) 62, to the gate driving unit (i.e., the scanning driver) 62, and provide a clock signal, a light-emitting stop signal, or the like, which are suitable for a specification of the light-emitting driver, to the light-emitting driver. The source driving unit (i.e., the data driver) 61 may generate a data voltage to be provided to the data signal lines D1, D2, D3, . . . , and Dn by using the gray-scale value and the control signal that are received from a first timing controller 18. For example, the source driving unit (i.e., the data driver) 61 may sample the gray-scale value by using the clock signal, and apply a data voltage corresponding to the gray-scale value to the data signal lines D1 to Dn by taking a pixel row as a unit, wherein n may be a natural number. The gate driving unit (i.e., the scanning driver) 62 may generate scanning signals to be provided to the scanning signal lines S1, S2, S3 . . . and Sm by receiving the clock signal, the scanning start signal, or the like, from the first timing controller 18. For example, the gate driving unit (i.e., the scanning driver) 62 may provide sequentially scanning signals with conducted level pulses to the scanning signal lines S1 to Sm. For example, the gate driving unit (i.e., the scanning driver) 62 may be constructed in a form of a shift register, and may generate scanning signals by transmitting sequentially scanning start signals provided in a form of conducted level pulses to a next-stage circuit under controlling of the clock signal, wherein m may be a natural number. The light-emitting driver may generate light-emitting signals to be provided to the light-emitting signal lines E1, E2, E3, . . . , and Eo, by receiving the clock signal, the light-emitting stop signal, or the like, from the timing controller 18. For example, the light-emitting driver may provide sequentially the light-emitting signals with turn-off level pulses to the light-emitting signal lines E1 to Eo. For example, the light-emitting driver may be constructed in a form of a shift register, and may generate the light-emitting signals by transmitting sequentially light-emitting stop signals provided in a form of turn-off level pulses to a next-stage circuit under controlling of the clock signal, wherein o may be a natural number. The pixel array may include a plurality of pixels PXij. Each pixel PXij may be connected to the corresponding data signal line, the corresponding scanning signal line, and the corresponding light-emitting signal line, wherein, i and j may be natural numbers. The pixel PXij may refer to a pixel in which a transistor is connected to an i-th scanning signal line and is connected to a j-th data signal line. In this way, it is achieved that the display panel 63 is driven to display.

In an exemplary embodiment, taking the touch display panel as an OLED display panel as an example, as shown in FIG. 6, the touch display driving apparatus 20 may include a touch driver (TP Tx) 66 and a data reader (TP Rx) 65 connected with the analog front end 12, and the touch panel 64 may include a plurality of touch electrodes (sensor pads) arranged in an array. For example, a touch electrode may be a sensing electrode for self-capacitive touch sensing, or a driving electrode for mutual capacitive touch sensing. For example, the analog front end 12 may provide, based on signals provided by the master oscillator 15 or the slave oscillator 16, a clock signal adapted to the touch driver (TP Tx) 66 to the touch driver (TP Tx) 66, to read a touch sensing signal generated by the touch electrodes on the touch panel 64, and may provide the received touch sensing signal generated by the sensing electrodes to the signal input and output end 21. The touch driver (TP Tx) may utilize a clock signal received from the analog front end 12 to generate the touch driving signal to be provided to the touch electrodes on the touch panel 64. The data reader (TP Rx) 65 may read the touch sensing signal generated by the touch electrodes on the touch panel 64, and provide the touch sensing signal to the analog front end 12, so that the analog front end 12 transmits the received touch sensing signal to the signal input and output end 21 to identify whether a user touches the touch panel 64 and a touch position of the user.

Here, the touch display driving apparatus shown in FIG. 4 is illustrated as an example in FIG. 6.

In an exemplary embodiment, the touch display apparatus may be a wearable device. In this way, optimization of a space may be achieved by sharing a memory in a touch display driving device, and in same time, maximization of processed data is achieved, so that a size of the touch display driving device is reduced, saving a space. Especially, an available space of the wearable device is relatively small, which still further highlights advantages of the touch display driving device in the embodiment of the present disclosure. Moreover, sharing the memory is implemented in the touch display driving device, which may effectively reduce a part of a power consumption, reducing a power consumption of a product.

For example, the wearable device may include, but is not limited to, a smart helmet or smart glasses, etc. For example, the wearable device may be a Virtual Reality (VR) display device.

In an exemplary embodiment, the wearable device may include a host. For example, taking the touch display panel being located in the wearable device, the host may be integrated in the wearable device, or may be an external computer device that can be connected in a wired or wireless manner with the touch display panel. For example, the host may be configured to render an image and send the rendered image to the touch display driving apparatus, so that the touch display driving apparatus may drive the touch display panel for display. For example, when the host and the touch display apparatus are physically separated, the host may be a Personal Computer (PC), or when the host and the touch display apparatus are physically co-located, the host may be an Application Processor (AP) in the touch display apparatus.

In an exemplary embodiment, the touch display apparatus may include, but is not limited to, an Organic Light-Emitting Diode (OLED) touch display apparatus or a Liquid Crystal Display (LCD) apparatus (such as a liquid crystal touch display apparatus), etc.

In addition, the touch display apparatus in the embodiment of the present disclosure may include other needed compositions and structures, such as a gate driving circuit (GOA), a source driver circuit (such as Source Driver), or the like, in addition to a structure such as the above touch display panel, the touch display driving apparatus, or the like, which may be correspondingly designed and supplemented by technicians in the art according to a type of the touch display apparatus, which will not be repeated here.

In an exemplary embodiment, the touch display apparatus may be any product or component having a display function such as a mobile phone, a tablet computer, a television, a display, a notebook computer, a digital photo frame, or a navigator, etc. Here, no limitation is made to the type of the display apparatus in the embodiment of the present disclosure. Other essential components of the touch display apparatus are all those that the skilled in the art would understand that the touch display apparatus should have, which will not be repeated here, and should not be taken as a limitation to the present disclosure.

Technical details undisclosed in the embodiments of the touch display apparatus of the present disclosure may be understood by those skilled in the art with reference to the descriptions in the embodiments of the touch display driving apparatus of the present disclosure, which will not be repeated here.

An embodiment of the present disclosure further provides a driving method, which may be applied to the touch display driving apparatus in one or more of the above embodiments.

In an exemplary embodiment, taking the driving method applied to the touch display driving apparatus shown in FIG. 2 as an example, the driving method may include a master oscillator provides a first output signal to an analog front end and provide a second output signal to a timing controller, under controlling of a signal input and output end. In this way, the touch display driving apparatus according to the embodiment of the present disclosure allows, in a working operation, that the analog front end and the timing controller may share the master oscillator, so, optimization of a space of the touch display driving apparatus may be achieved, and an amount of processed data may be maximized in same processing time, which can avoid waste of resources. Moreover, by sharing the master oscillator, a size of the touch display driving apparatus will be reduced, which can save a space required by a device, facilitating a development and an application of miniaturization of the device. Moreover, by sharing the master oscillator, a loss of a power consumption caused by the slave oscillator and the display oscillator may be effectively avoided, so that a power consumption of the device will also be reduced.

Figure 7:
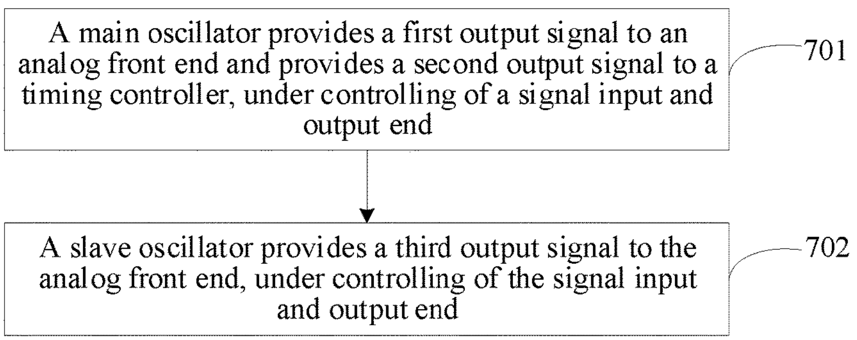
FIG. 7 is a flow schematic diagram of a driving method in an exemplary embodiment of the present disclosure.

In an exemplary embodiment, taking the driving method applied to the touch display driving apparatus shown in FIG. 3 as an example, as shown in FIG. 7, the driving method may include the following acts 701 to 702.

In the act 701, a master oscillator provides a first output signal to an analog front end and provides a second output signal to a timing controller, under controlling of a signal input and output end.

In the act 702, a slave oscillator provides a third output signal to the analog front end, under controlling of the signal input and output end.

In this way, in a working operation, the touch display driving apparatus according to the embodiment of the present disclosure allows that the analog front end and the timing controller may share the master oscillator, by the master oscillator being assisted by the slave oscillator to work, and by integrating data inputted from the signal input and output end by the slave oscillator and the master oscillator, two paths of signals (including the first output signal transmitted by the master oscillator to the analog front end and the third output signal transmitted by the slave oscillator to the analog front end) may be transmitted to the analog front end. So, on one hand, a size of the touch display driving apparatus will be reduced, which can save a space required by a device, facilitating a development and an application of miniaturization of the device, moreover, by canceling the display oscillator, a loss of a power consumption caused by the display oscillator may be effectively avoided, so that a power consumption of the device will also be reduced. On the other hand, by reasonable utilization of the slave oscillator and the master oscillator in a same space, a data transmission speed may be increased, improving an operation speed of the touch display driving apparatus.

Figure 8:
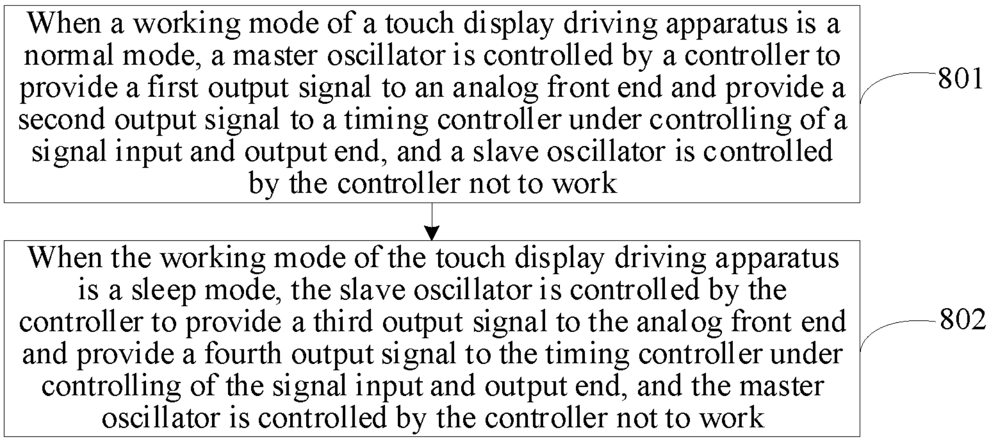
FIG. 8 is another flow schematic diagram of a driving method in an exemplary embodiment of the present disclosure.

In an exemplary embodiment, taking the driving method applied to the touch display driving apparatus shown in FIG. 4 as an example, as shown in FIG. 8, the driving method may include the following acts 801 to 802.

In the act 801, when a working mode of the touch display driving apparatus is a normal mode, a master oscillator is controlled by a controller to provide a first output signal to an analog front end and provide a second output signal to a timing controller under controlling of a signal input and output end, and a slave oscillator is controlled by the controller not to work.

In the act 802, when the working mode of the touch display driving apparatus is a sleep mode, the slave oscillator is controlled by the controller to provide a third output signal to the analog front end and provide a fourth output signal to the timing controller under controlling of the signal input and output end, and the master oscillator is controlled by the controller not to work.

In this way, for the touch display driving apparatus according to the embodiment of the present disclosure, when the working mode of the touch display driving apparatus is the normal mode, the controller controls the analog front end and the timing controller to share the master oscillator, while when the working mode of the touch display driving apparatus is the sleep mode, the controller controls the analog front end and the timing controller to share the slave oscillator, which may not only achieve optimization of a space of the touch display driving apparatus, and reach a maximum of amount of processed data in same processing time, which avoid waste of resources, and make a size of the touch display driving apparatus reduced, which can save a space required by a device, facilitating a development and an application of miniaturization of the device, and may effectively avoid a loss of a power consumption caused by the touch oscillator and the display oscillator, so that a power consumption of the device will also be reduced, but also may achieve a reasonable use of the master oscillator and the slave oscillator, so that a power consumption will be lower, when the working mode of the touch display driving apparatus is the sleep mode.

Figure 9:
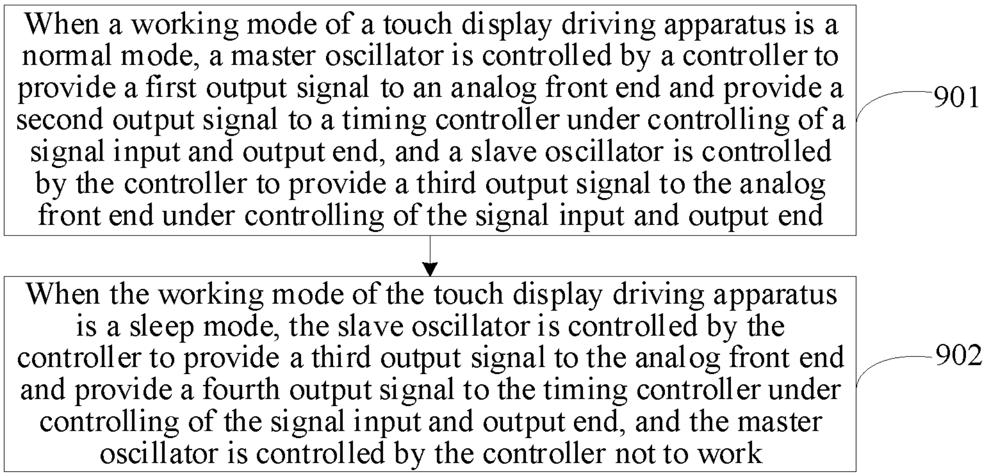
FIG. 9 is yet another flow schematic diagram of a driving method in an exemplary embodiment of the present disclosure.

In an exemplary embodiment, still taking the driving method applied to the touch display driving apparatus shown in FIG. 4 as an example, as shown in FIG. 9, the driving method may include the following acts 901 to 902.

In the act 901, when a working mode of the touch display driving apparatus is a normal mode, a master oscillator is controlled by a controller to provide a first output signal to an analog front end and provide a second output signal to a timing controller under controlling of a signal input and output end, and a slave oscillator is controlled by the controller to provide a third output signal to the analog front end under controlling of the signal input and output end.

In the act 902, when the working mode of the touch display driving apparatus is a sleep mode, the slave oscillator is controlled by the controller to provide a third output signal to the analog front end and provide a fourth output signal to the timing controller under controlling of the signal input and output end, and the master oscillator is controlled by the controller not to work.

In this way, for the touch display driving apparatus according to the embodiment of the present disclosure, by sharing the master oscillator when the working mode of the touch display driving apparatus is the normal mode, or by sharing the slave oscillator when the working mode of the touch display driving apparatus is the sleep mode, a reasonable use of the master oscillator and the slave oscillator may be achieved, achieving optimization of a space of the touch display driving apparatus, and a maximum of amount of processed data may be reached in same processing time, which avoid waste of resources, and make a size of the touch display driving apparatus reduced, which can save a space required by a device, facilitating a development and an application of miniaturization of the device, and may effectively avoid a loss of a power consumption caused by the touch oscillator and the display oscillator, so that a power consumption of the device will also be reduced. In addition, when the working mode of the touch display driving apparatus is the normal mode, the slave oscillator assists the master oscillator in working, which may allow a data transmission speed to be increased, improving an operation speed of the touch display driving apparatus.

Technical details undisclosed in the embodiment of the driving method of the present embodiment are understood by those skilled in the art with reference to the descriptions in the embodiment of the touch display driving apparatus of the present disclosure, which will not be repeated here.

Although the implementation modes of the present disclosure are disclosed above, the contents are only implementation modes for easily understanding the present disclosure and not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A touch display driving apparatus, comprising an analog front end, a timing controller, and a master oscillator, wherein the master oscillator is connected with a signal input and output end, the analog front end, and the timing controller, respectively, and is configured to provide a first output signal to the analog front end and provide a second output signal to the timing controller, under controlling of the signal input and output end.

2. The apparatus of claim 1, further comprising: a slave oscillator, connected with the signal input and output end and the analog front end, respectively, and configured to provide a third output signal to the analog front end, under controlling of the signal input and output end.

3. The apparatus of claim 2, further comprising: a controller, connected with the master oscillator, the slave oscillator, the analog front end, and the timing controller, respectively, wherein the controller is configured to control, according to a working mode of the touch display driving apparatus, a first connection state between the master oscillator, and the analog front end and the timing controller, and control a second connection state between the slave oscillator, and the analog front end and the timing controller, wherein the working mode of the touch display driving apparatus comprises a normal mode and a sleep mode, and a power consumption of the touch display driving apparatus in the sleep mode is less than a power consumption of the touch display driving apparatus in the normal mode.

4. The apparatus of claim 3, wherein the controller is configured to conduct connections between the master oscillator, and the analog front end and the timing controller, and disconnect connections between the slave oscillator, and the analog front end and the timing controller, in a case that the working mode of the touch display driving apparatus is the normal mode;

the master oscillator is configured to provide the first output signal to the analog front end and provide the second output signal to the timing controller, under controlling of the signal input and output end, in a case that the working mode of the touch display driving apparatus is the normal mode; and the slave oscillator is configured not to work, in a case that the working mode of the touch display driving apparatus is the normal mode.

5. The apparatus of claim 4, wherein the signal input and output end comprises: a flash interface, and any one or more of an Inter-integrated Circuit (I2C) interface, a Serial Peripheral Interface (SPI), and a General Purpose Input/Output (GPIO) interface.

6. The apparatus of claim 3, wherein the controller is configured to conduct connections between the master oscillator, and the analog front end and the timing controller, and disconnect a connection between the slave oscillator and the timing controller, in a case that the working mode of the touch display driving apparatus is the normal mode;

the master oscillator is configured to provide the first output signal to the analog front end and provide the second output signal to the timing controller, under controlling of the signal input and output end, in a case that the working mode of the touch display driving apparatus is the normal mode; and the slave oscillator is configured to provide the third output signal to the analog front end, under controlling of the signal input and output end, in a case that the working mode of the touch display driving apparatus is the normal mode.

7. The apparatus of claim 6, wherein the signal input and output end comprises: a flash interface, and any one or more of an Inter-integrated Circuit (I2C) interface, a Serial Peripheral Interface (SPI), and a General Purpose Input/Output (GPIO) interface.

8. The apparatus of claim 3, wherein the controller is configured to disconnect connections between the master oscillator, and the analog front end and the timing controller, and conduct connections between the slave oscillator, and the analog front end and the timing controller, in a case that the working mode of the touch display driving apparatus is the sleep mode;

the master oscillator is configured not to work, in a case that the working mode of the touch display driving apparatus is the sleep mode; and the slave oscillator is configured to provide the third output signal to the analog front end and provide a fourth output signal to the timing controller, under controlling of the signal input and output end, in a case that the working mode of the touch display driving apparatus is the sleep mode.

9. The apparatus of claim 8, wherein a frequency of the third output signal is less than a frequency of the first output signal, and/or a frequency of the fourth output signal is less than a frequency of the second output signal.

10. The apparatus of claim 9, wherein the signal input and output end comprises: a flash interface, and any one or more of an Inter-integrated Circuit (I2C) interface, a Serial Peripheral Interface (SPI), and a General Purpose Input/Output (GPIO) interface.

11. The apparatus of claim 8, wherein the timing controller is connected with a touch display panel, and is configured to provide a timing signal with a stable waveform to the touch display panel according to the second output signal or the fourth output signal.

12. The apparatus of claim 8, wherein the analog front end is connected with a touch display panel, and is configured to process at least one of the first output signal and the third output signal, and provide a touch driving signal to the touch display panel.

13. The apparatus of claim 8, wherein the signal input and output end comprises: a flash interface, and any one or more of an Inter-integrated Circuit (I2C) interface, a Serial Peripheral Interface (SPI), and a General Purpose Input/Output (GPIO) interface.

14. The apparatus of claim 3, wherein the controller comprises: any one of a micro-control unit and a control circuit comprising at least one transistor.

15. The apparatus of claim 3, wherein the signal input and output end comprises: a flash interface, and any one or more of an Inter-integrated Circuit (I2C) interface, a Serial Peripheral Interface (SPI), and a General Purpose Input/Output (GPIO) interface.

16. The apparatus of claim 2, wherein the signal input and output end comprises: a flash interface, and any one or more of an Inter-integrated Circuit (I2C) interface, a Serial Peripheral Interface (SPI), and a General Purpose Input/Output (GPIO) interface.

17. The apparatus of claim 1, wherein the signal input and output end comprises: a flash interface, and any one or more of an Inter-integrated Circuit (I2C) interface, a Serial Peripheral Interface (SPI), and a General Purpose Input/Output (GPIO) interface.

18. A touch display apparatus, comprising: a touch display panel and a touch display driving apparatus connected with the touch display panel, wherein the touch display driving apparatus is the touch display driving apparatus of claim 1.

19. The apparatus of claim 18, wherein the touch display apparatus is a wearable device.

20. A driving method, applied to the touch display driving apparatus of claim 1, wherein the method comprises:

providing, by the master oscillator, the first output signal to the analog front end and providing the second output signal to the timing controller, under controlling of the signal input and output end.

* * * * *